Oct. 13, 1959     L. BRÜTTING     2,908,108

SUPPORTING STAND FOR GYRATORY TOYS

Filed Nov. 5, 1956

Inventor
Ludwig Brütting
By Ralph B. Stewart
attorney

United States Patent Office 2,908,108
Patented Oct. 13, 1959

2,908,108
SUPPORTING STAND FOR GYRATORY TOYS

Ludwig Brütting, Zirndorf, near Nurnberg, Germany, assignor to Firma M. Fuchs, Metallwarenfabrik, Zirndorf, near Nurnberg, Germany Application November 5, 1956, Serial No. 620,500

Claims priority, application Germany November 16, 1955

6 Claims. (Cl. 46—66)

The invention relates to a supporting stand for gyratory toys, such as tops—preferably musical or humming tops, merry-go-rounds, dancing figures and the like, which is made from plastic material. It consists of a dome or hollow cone-shaped body with a neck-like socket for accommodating the axle of the toy, for example, a top.

The supporting stand has for its object to prevent the toy, e.g. top, from toppling over when it is rotating. In the case of tune-changing or so-called automatic tops, it also serves for preventing the rotation of the top axle projecting from the casing of the top. Whereas in the case of ordinary push-actuated tops, it serves as bearing for the top axle.

Hitherto such supporting stands were normally made from sheet metal. To allow the lateral deflection of the top axle, the stand was provided with a spring arrangement. The production of such stands was therefore relatively expensive. Moreover, there was always the danger of their becoming dented if roughly handled. A misshapen stand is, however, useless.

It has therefore been proposed to make the supporting stand in dome or hollow conical shape from rubber or similar material, to provide it with a non-slipping resting surface and with an extension which accommodates the axle of the top and allows it to swing out laterally.

Differing from these known constructions, the supporting stand according to the invention is constructed in such a manner that a neck-like socket member projects into the interior of the dome-shaped body and is supported by radial ribs extending between the socket and the inner wall of the stand body. At the same time it has been found particularly advantageous to connect the ribs on the one hand to the stand wall along their entire length and on the other hand to the socket member only at the upper end thereof. Furthermore, it is advisable to make the wall of the stand in a series of annular steps. These ribs serve as stiffening and distance pieces so that the stand retains its shape even under one-sided pressure such as is exerted when the top is spinning with its axle in an inclined position, and always returns into its normal position as the top axle moves into the vertical.

According to the invention a stand body is produced in which the wall of the body and the socket member in the interior of the body, as well as the reinforcing ribs maintaining the socket member in position are produced as a one-piece element preferably from plastic material, such as polyethylene. The dome-shaped body being stiffened by these ribs is capable of withstanding strains and stresses, even if the top is subjected to rough treatment.

The inner neck-like socket member of the stand may be provided with a blind hole for receiving the axle of the top. Moreover, a screw may be also provided at the bottom end of the hole for fixing the axle of the top against rotation.

Several embodiments of the invention are illustrated by way of example in the accompanying drawing, in which.

Figure 1:
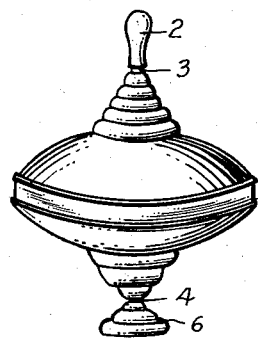
Fig. 1 shows a top in perspective view.

The top has a musical mechanism in the interior of its casing. This is known, irrespectively of whether the top is of the ordinary standing type or an automatic top with tune changing device, and is consequently neither illustrated in the drawing nor described in detail. It is only mentioned that the push-rod 3 provided with a handle 2 and capable of being fitted and removed is constructed as a spindle.

Figure 2A:
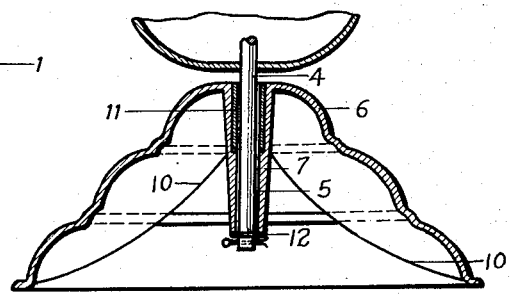
Fig. 2a is a longitudinal section on a larger scale showing a supporting stand for a push-operated top.
Figure 2B:
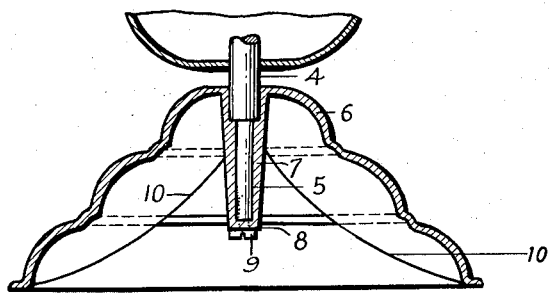
Fig. 2b is also a longitudinal section on a larger scale showing a supporting stand for an automatic top.
Figure 3:
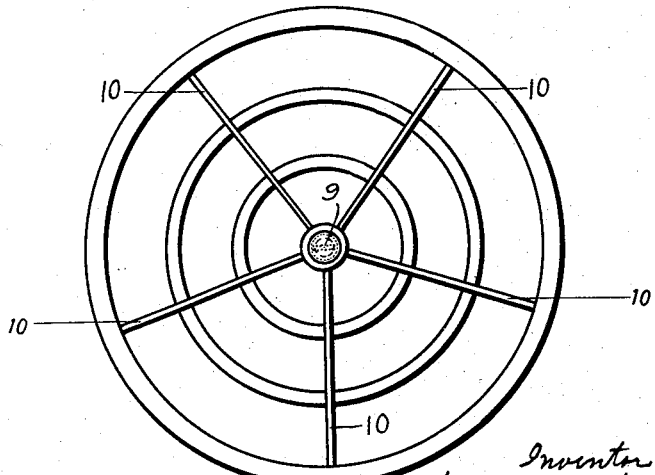
Fig. 3 is a bottom plan view of the stand.

An axle 4 projects downwardly from the casing of the top also in known manner. In the case of a push-operated top, the end portion 5 of the axle 4 fits loosely in the socket 7, as shown in Fig. 2a, and a sleeve 11 made of a metal such as brass, is fitted in this socket and the end portion 5 of the axle 4 rotates also loosely in this sleeve. The extremity of the end portion 5 is keyed, spread, clinched or otherwise secured in the socket, a washer 12 being preferably interposed between the securing means and the lower end of the socket. If, however, the top is, for example a humming top with tune changing device, the end portion 5 of the axle 4 is fixed as shown in Fig. 2b and consequently cannot turn in the socket 7.

The supporting stand is a dome or hollow conical shaped body 6 which is preferably in one-piece composed of several stepped ring-shaped zones. The neck-like socket member 7 is located in the interior of the stand body and the end portion 5 of the top axle 4 sits in the socket therein.

If desired, the bottom 8 of the shank 7 may be provided with a hole through which a screw 9 can be introduced which engages the end portion 5 of the top axle 4. In this manner a screw may be substituted for the key or clinching in the case of Fig. 2a and serve as additional means for fixing the axle in the socket member in the case of Fig. 2b.

The socket member is supported laterally by a plurality of radial ribs 10. These and also the socket member 7 are also made in one piece with the stand body 6. They are formed on the one hand on the inner side of the body wall and on the other hand on the socket member 7, at least in the upper zone thereof.

I claim:

1. In combination with the axle of a gyratory toy, a supporting stand comprising a hollow dome-shaped body of substantially resilient synthetic plastic material, a socket member for receiving an extension on the lower end of the toy axle, said socket member being secured to the top of the dome and projecting into the interior of the dome towards the base thereof, and plate-like rib members arranged in vertical planes within said body and engaging and extending upwardly along the inner wall of the body and secured at their inner ends to the upper portion of the socket member.

2. A supporting stand as set forth in claim 1, wherein the dome-shaped body is composed of a series of annular steps.

3. A supporting stand as set forth in claim 1, wherein the extension of the toy axle projects from the lower end of the socket member and is provided at its extremity with means for securing it in the socket.

4. A supporting stand as set forth in claim 1, wherein the extension of the toy axle fits loosely in the socket member and is guided by a metal sleeve bearing fitted in the upper end of the socket member.

5. A supporting stand as set forth in claim 1, wherein the extension of the toy axle fits tightly in the socket member and is secured against rotation.

6. A supporting stand as set forth in claim 1, wherein the extension of the toy axle fits tightly in the socket of the socket member and is additionally secured against rotation by a screw passing through the bottom of the socket member.

References Cited in the file of this patent

UNITED STATES PATENTS

| | | |
|---|---|---|
| 748,087 | Mighels et al. | Dec. 29, 1903 |
| 1,328,134 | Doelckner | Jan. 13, 1920 |
| 1,394,070 | Diffany | Oct. 18, 1921 |
| 1,571,254 | Foote | Feb. 2, 1926 |
| 1,674,823 | Griffiths | June 26, 1928 |
| 2,778,597 | Haumerson | Jan. 22, 1957 |

FOREIGN PATENTS

| | | |
|---|---|---|
| 340,701 | Germany | Mar. 2, 1920 |
| 1,038,949 | France | May 13, 1953 |